United States Patent [19]

Sakiyama et al.

[11] Patent Number: 4,804,222
[45] Date of Patent: Feb. 14, 1989

[54] FRONT STRUCTURE OF VEHICLE BODY

[75] Inventors: Noritaka Sakiyama; Osamu Matsuura, both of Hiroshima, Japan

[73] Assignee: Mazda Motor Corporation, Hiroshima, Japan

[21] Appl. No.: 924,212

[22] Filed: Oct. 28, 1986

[30] Foreign Application Priority Data

Oct. 31, 1985 [JP] Japan .............................. 60-245215
Oct. 31, 1985 [JP] Japan .............................. 60-245216
Oct. 31, 1985 [JP] Japan .............................. 60-245217

[51] Int. Cl.⁴ ............................................. B62D 23/00
[52] U.S. Cl. .................................... 296/203; 296/204; 296/209; 296/29
[58] Field of Search ............... 296/187, 188, 194, 195, 296/203, 204, 209, 29, 30, 192

[56] References Cited

U.S. PATENT DOCUMENTS

| 4,068,884 | 1/1978 | Watanabe et al. | 296/204 |
| 4,189,177 | 2/1980 | Schwuchow | 296/188 |
| 4,466,653 | 8/1984 | Harasaki | 296/189 |
| 4,469,368 | 9/1984 | Eger | 296/188 |
| 4,557,519 | 12/1985 | Matsuura | 296/204 |
| 4,669,776 | 6/1987 | Harasaki | 296/194 |

FOREIGN PATENT DOCUMENTS

196360 10/1980 European Pat. Off. .
59-109468 6/1984 Japan .

*Primary Examiner*—Dennis H. Pedder
*Attorney, Agent, or Firm*—Gerald J. Ferguson, Jr.

[57] ABSTRACT

A front structure of a vehicle body includes a front frame which extends in the longitudinal direction of the vehicle body and is formed of an outer frame and an inner frame connected together to form a closed cross section. A dahsboard lower panel is disposed near the rear edge of the front frame to vertically extend, and a front floor extends rearward from the lower edge of the dashboard lower panel. A side sill is disposed on one side of the front floor at a height lower than the front frame, and a floor frame is disposed on the inner side of the side sill at a height lower than the front frame. The rear end portion of the front frame is connected to the side sill by way of a frame member and to the front end portion of the floor frame by way of another frame member.

8 Claims, 9 Drawing Sheets

FRONT STRUCTURE OF VEHICLE BODY

BACKGROUND OF THE INVENTION

1. Field of the Invention

This invention relates to a front structure of a vehicle body.

2. Description of the Prior Art

In the front structure disclosed in Japanese Unexamined Patent Publication No. 59(1984)-109468, the front frame extending in the longitudinal direction of the vehicle body is formed by connecting an outer frame and a channel-shaped inner frame to have a closed cross section and the rear end of the front frame is connected to the dashboard lower panel in order to ensure a sufficient strength.

However, since the suspension tower disposed on the outer side of the front frame is apt to be deformed due to external forces such as vibration and impacts transmitted from the suspension, it is desired that the part of the front frame near the suspension tower be further strengthened to prevent the suspension tower from inclining.

Further, the front structure disclosed in the above Japanese patent publication is not sufficient from the viewpoint of the rigidity of the vehicle body.

SUMMARY OF THE INVENTION

In view of the foregoing observations and description, the primary object of the present invention is to provide an improved front structure of a vehicle which can ensure a sufficient rigidity of the vehicle body.

Another object of the present invention is to provide an improved front structure of a vehicle in which the strength of the part of the front frame near the suspension tower can be substantially increased.

In accordance with the present invention, there is provided a front structure of a vehicle body comprising a front frame which extends in the longitudinal direction of the vehicle body and is formed of an outer frame and an inner frame connected together to form a closed cross section, a dashboard lower panel disposed near the rear edge of the front frame to vertically extend, a front floor extending rearward from the lower edge of the dashboard lower panel, a side sill disposed on one side of the front floor at a height lower than the front frame, a floor frame disposed on the inner side of the side sill at a height lower than the front frame, a first frame member connecting the rear end portion of the front frame to the side sill, and a second frame member connecting the rear end portion of the front frame to the front end portion of the floor frame.

DESCRIPTION OF THE PREFERRED EMBODIMENTS

Figure 1:
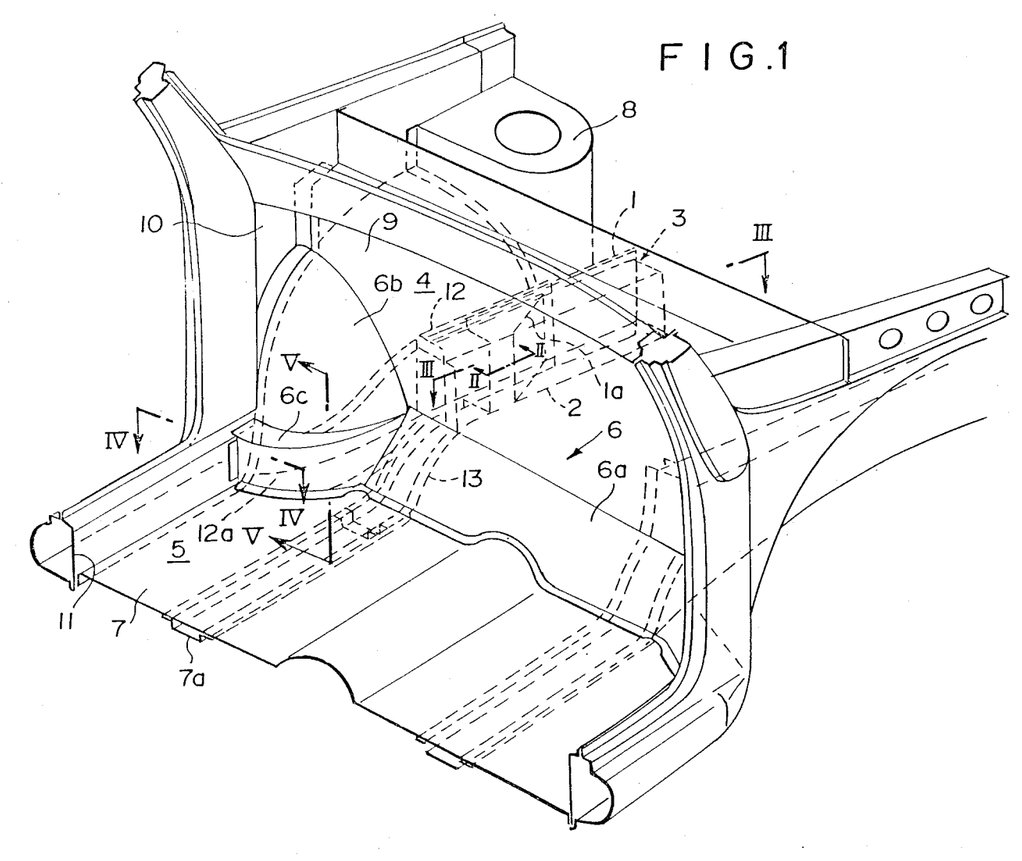
FIG. 1 is a fragmentary perspective view of a front structure of a vehicle body in accordance with an embodiment of the present invention.

In FIG. 1, an outer frame 1 which is in the form of a vertical flat plate and an inner frame 2 which is a channel-like member are connected together to form a front frame 3 having a closed cross section. The front frame 3 extends in an engine room 4 in the longitudinal direction of the vehicle body. A dashboard lower panel 6 is provided on the rear side of the front frame 3 to vertically extend and separate the engine room 4 from a passenger compartment 5. The lower end portion of the dashboard lower panel 6 is bent obliquely rearward to form a rake surface portion 6a and is connected to a floor panel 7. A curved surface portion 6b and a projecting portion 6c are integrally provided on the outer side of the rake surface portion 6a of the dashboard lower panel 6. The curved surface portion 6b is formed as an extension of a wheel apron 9 formed on the rear side of a suspension tower 8, and is connected to an outer panel 10. The projecting portion 6c is formed on the lower side of the curved surface portion 6b to bulge rearward and is connected to a side sill 11.

The outer frame 1 of the front frame 3 has a bent portion 1a which extends obliquely rearward from a portion of the front frame 3 immediately behind the suspension tower 8 toward the inner frame 2 across the closed cross-section front frame 3 and is connected to the inner peripheral surface of the inner frame 2. An outer rear frame 12 is connected to the outer surface of the outer frame 1 to extend rearward from a portion of the outer frame 1 on the front side of the bent portion 1a.

The outer rear frame 12 extends below the outer portion of the dashboard lower panel 6 and the rear end 12a thereof is connected to the side sill 11 with the cross section of the outer rear frame 12 gradually changing toward the rear end 12a from a portion near the front surface of the dashboard lower panel 6. The outer rear frame 12 is bowed forward at the portion where the cross section changes and the periphery of the bowed portion is connected to the dashboard lower panel 6 or the floor panel 7 to form a closed cross section portion together with the curved surface portion 6b and the projection portion 6c of the dashboard lower panel 6.

The inner frame 2 of the front frame 3 extends in the longitudinal direction of the vehicle body and is connected to the dashboard lower panel 6 at the rear end thereof. To the lower surface of the rear end portion of the inner frame 2 is connected a front end portion of a channel-shaped joint frame 13 which is connected to the front surface of the rake surface portion 6a of the dashboard lower panel 6. The joint frame 13 is connected, at the lower surface of the floor panel 7, to a floor frame 7a connected to the floor panel 7 to extend in the longitudinal direction of the vehicle body.

Figure 2:
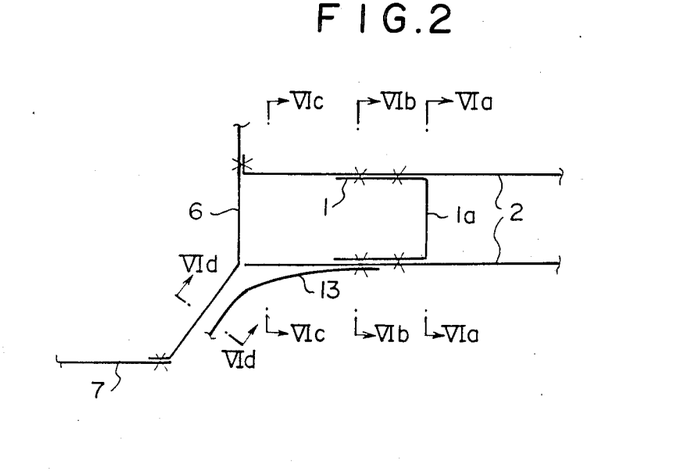
FIG. 2 is a cross-sectional view taken along line II—II in FIG. 1.
Figure 3:
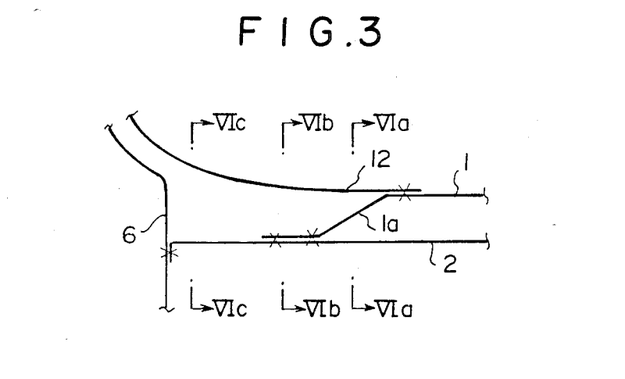
FIG. 3 is a cross-sectional view taken along line III—III in FIG. 1.
Figure 4:
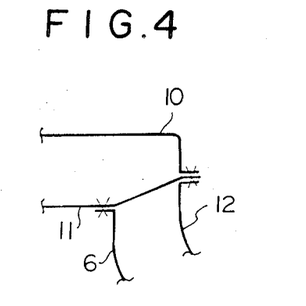
FIG. 4 is a cross-sectional view taken along line IV—IV in FIG. 1.
Figure 5:
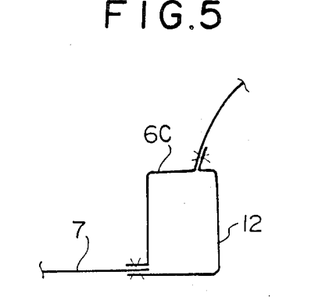
FIG. 5 is a cross-sectional view taken along line V—V in FIG. 1.
Figures 6A, 6B:
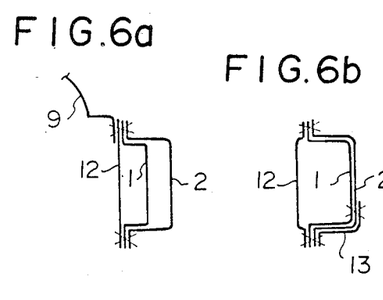
FIG. 6a is a cross-sectional view taken along line VIa—VIa in FIGS. 2 and 3.
FIG. 6b is a cross-sectional view taken along line VIb—VIb in FIGS. 2 and 3.
Figure 6C:
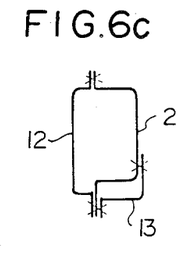
FIG. 6c is a cross-sectional view taken along line VIc—VIc in FIGS. 2 and 3.
Figure 6D:
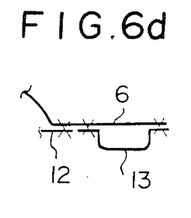
FIG. 6d is a cross-sectional view taken along line VId—VId in FIGS. 1 and 2.

FIGS. 2 to 5 are cross-sectional views respectively taken along lines II—II, III—III, IV—IV and V—V in FIG. 1, and FIGS. 6a to 6d are cross-sectional views respectively taken along lines VIa—VIa, VIb—VIb, VIc—VIc and VId—VId in FIGS. 2 and 3.

The members are spot-welded at places indicated by X's in FIGS. 2 to 6.

Figure 7:
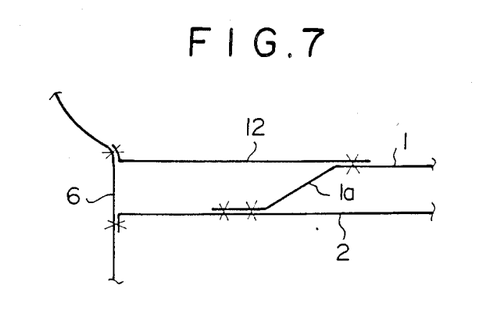
FIG. 7 is a view similar to FIG. 3 but showing a modification of the embodiment of FIG. 1.

As can be understood from the description above and from the drawings, in the front structure of this embodiment, the outer frame 1 is bent inwardly at a portion near the rear side of the suspension tower 8 and is connected to the inner frame 2. Accordingly, a "node" is formed in the cross-section of the front frame 3, and a sufficient strength against vibration and impacts transmitted from the suspension through the suspension tower 8 can be ensured irrespective of the fact that the outer rear frame 12 extends to the side side sill 11 without being connected to the vertical surface of the dashboard lower panel 6. Of course, the portion of the front frame 3 near the rear side of the suspension tower 8 can be further strengthened by directly connecting the rear end portion of the outer rear panel 12 as shown in FIG. 7.

FIGS. 8 to 13 show another embodiment of the present invention.

Figure 8:
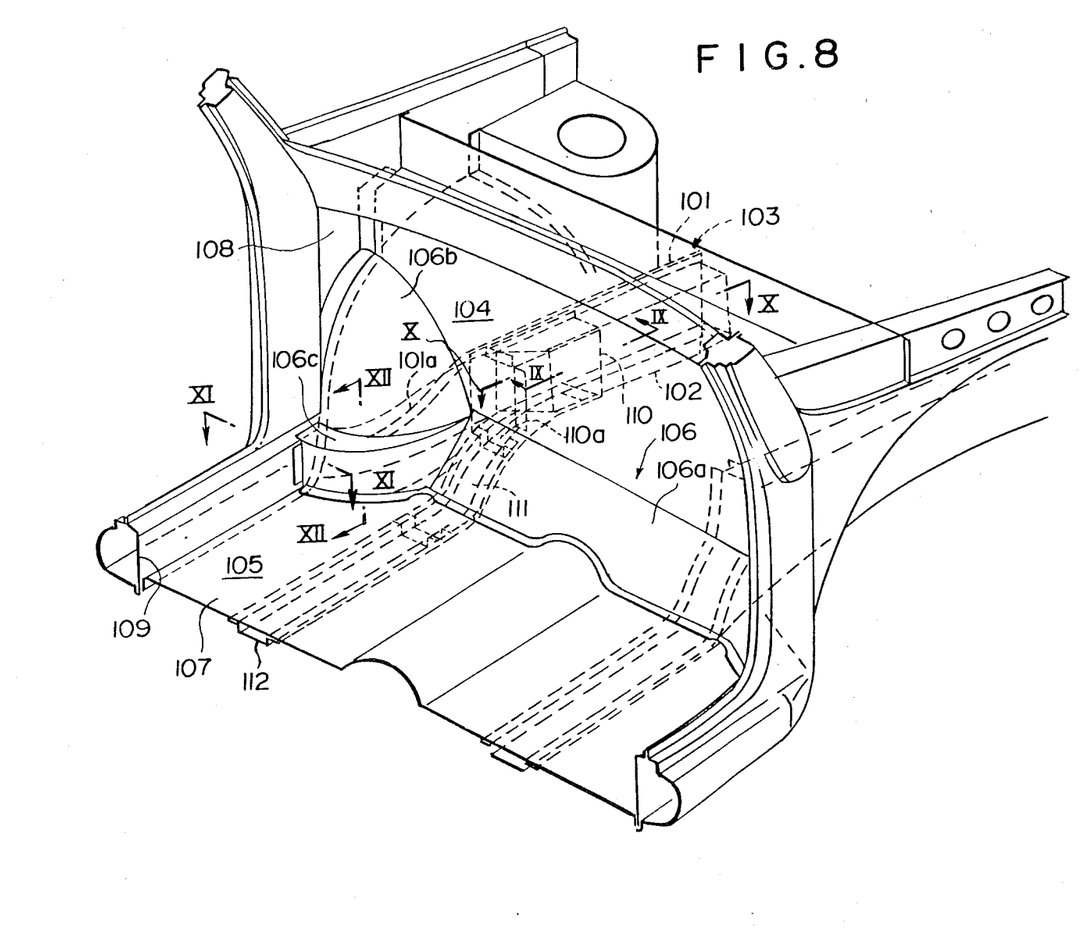
FIG. 8 is a fragmentary perspective view of a front structure of a vehicle body in accordance with another embodiment of the present invention.

In FIG. 8, an outer frame 101 which is in the form of a vertical flat plate and an inner frame 102 which is a channel-like member are connected together to form a front frame 103 having a closed cross section. The front frame 103 extends in an engine room 104 in the longitudinal direction of the vehicle body. A dashboard lower panel 106 is provided on the rear side of the front frame 103 to vertically extend and separate the engine room 104 from a passenger compartment 105. The lower end portion of the dashboard lower panel 106 is bent obliquely rearward to form a rake surface portion 106a and is connected to a floor panel 107. A curved surface portion 106b and a projecting portion 106c are integrally provided on the outer side of the rake surface portion 106a of the dashboard lower panel 106. The curved surface portion 106b is formed as an extension of a wheel apron formed on the rear side of a suspension tower, and is connected to an outer panel 108. The projecting portion 106c is formed on the lower side of the curved surface portion 106b to bulge rearward and is connected to a side sill 109.

The outer frame 101 of the front frame 103 extends below the outer portion of the dashboard lower panel 106 and the rear end 101a thereof is connected to the side sill 109 with the cross section of the outer frame 101 gradually changing toward the rear end 101a from a portion near the front surface of the dashboard lower panel 106. The outer frame 101 is bowed forward at the portion where the cross section changes and the periphery of the bowed portion is connected to the dashboard lower panel 106 or the floor panel 107 to form a closed cross section portion together with the curved surface portion 106b and the projecting portion 106c of the dashboard lower panel 106.

The inner frame 102 of the front frame 103 has a bent portion 102b which extends obliquely rearward from a portion of the front frame 3 near the front surface of the dashboard lower panel 106 toward the outer frame 101 across the closed cross-section front frame 103 and is connected to the outer frame 101 at the distal end portion 102a thereof. A gusset 110 is provided on the inner frame 102 along the outer surface thereof to cover the bent portion 102b.

The gusset 110 is connected to the inner frame 102 at the outer, inner, upper and lower sides thereof. The lower side of the gusset 10 extends below the dashboard lower panel 106 and the rear end portion 110a of the lower side of the gusset 110 is connected to a front end portion of a channel-shaped joint frame 111 which is connected to the front surface of the rake surface portion 106a of the dashboard lower panel 106. The lower side of the gusset 110 is gradually bowed downward from a portion near the front side of the dashboard lower panel 106 toward the rear end portion 110a to be smoothly merged into the joint frame 11. The joint frame 111 is connected, at the lower surface of the floor panel 107, to a floor frame 112 connected to the floor panel 107 to extend in the longitudinal direction of the vehicle body.

Figure 9:
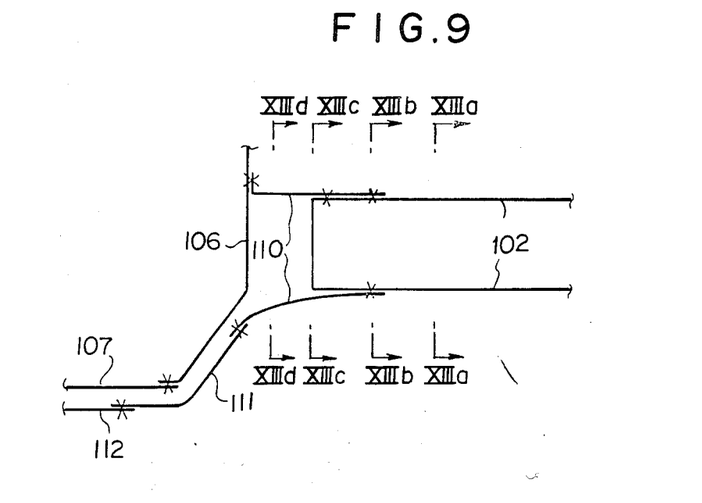
FIG. 9 is a cross-sectional view taken along line IX—IX in FIG. 8.
Figure 10:
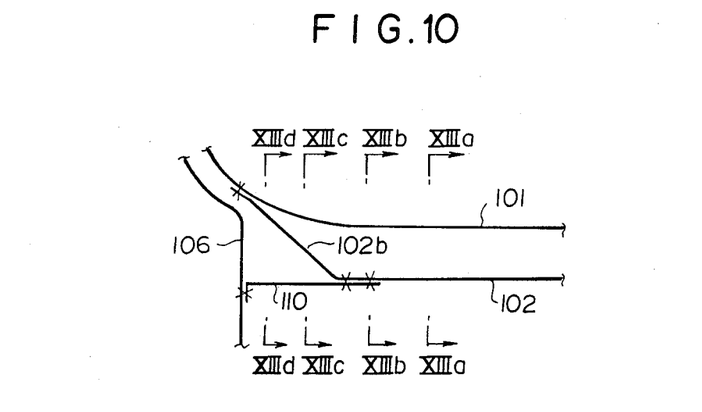
FIG. 10 is a cross-sectional view taken along line X—X in FIG. 8.
Figure 11:
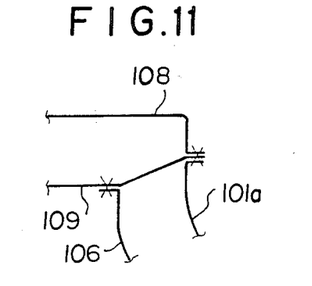
FIG. 11 is a cross-sectional view taken along line XI—XI in FIG. 8.
Figure 12:
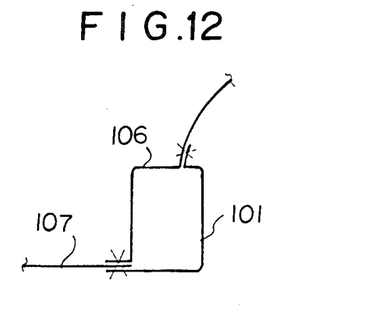
FIG. 12 is a cross-sectional view taken along line XII—XII in FIG. 8.
Figure 13A:
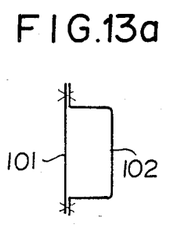
FIG. 13a is a cross-sectional view taken along line XIIIa–XIIIa in FIGS. 9 and 10.
Figure 13B:
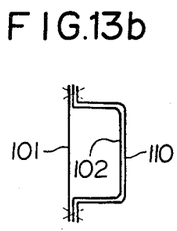
FIG. 13b is a cross-sectional view taken along line XIIIb—XIIIb in FIGS. 9 and 10.
Figure 13C:
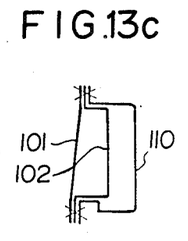
FIG. 13c is a cross-sectional view taken along line XIIIc—XIIIc in FIGS. 9 and 10.
Figure 13D:
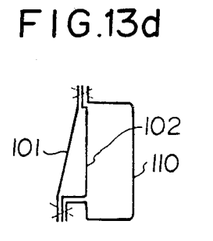
FIG. 13d is a cross-sectional view taken along line XIIId—XIIId in FIGS. 9 and 10.

FIGS. 9 to 12 are cross-sectional views respectively taken along lines IX—IX, X—X, XI—XI, and XII—XII in FIG. 8, and FIGS. 13a to 13d are cross-sectional views respectively taken along lines XIIIa—XIIIa, XIIIb—XIIIb, XIIIc—XIIIc and XIIId—XIIId in FIGS. 9 and 10.

The members are spot-welded at places indicated by X's in FIGS. 9 to 13.

Figure 14:
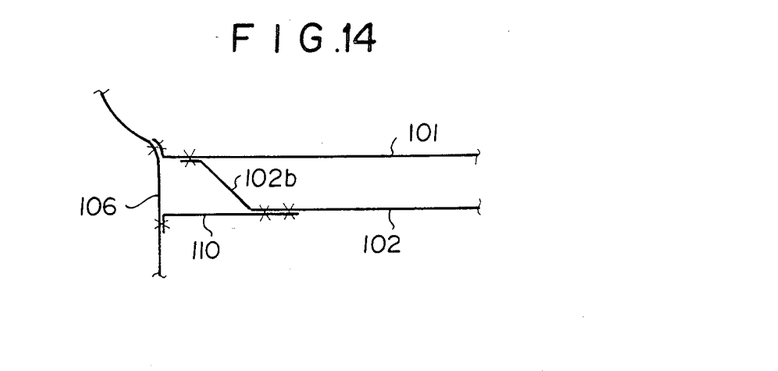
FIG. 14 is a view similar to FIG. 10 but showing a modification of the embodiment of FIG. 8.

As can be understood from the description above and from the drawings, in the front structure of this embodiment, the rear portion of the inner frame 102 is bent outwardly and is connected to the outer frame 101 and the gusset 110 is provided to cover the bent portion 102b of the inner frame 102. Accordingly, a "node" is formed in the cross section of the front frame 103, and a sufficient strength can be ensured irrespective of the fact that the outer frame 101 extends to the side sill 109 without being connected to the vertical surface of the dashboard lower panel 106. Of course, the rear end portion of the front frame 103 can be further strengthened by directly connecting the rear end portion of the outer frame 101 as shown in FIG. 14.

FIGS. 15 to 20 show still another embodiment of the present invention.

Figure 15:
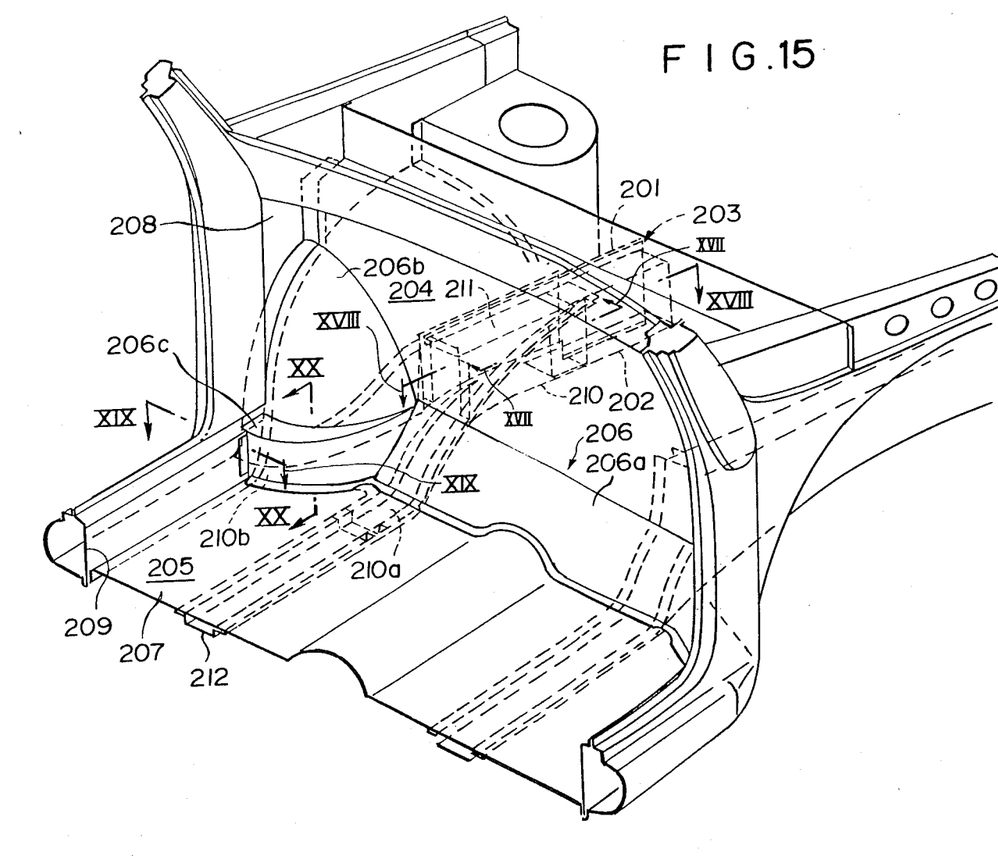
FIG. 15 is a fragmentary perspective view of a front structure of a vehicle body in accordance with still another embodiment of the present invention.

In FIG. 15, an outer frame 201 which is in the form of a vertical flat plate and an inner frame 202 which is a channel-like member are connected together to form a front frame 203 having a closed cross section. The front frame 203 extends in an engine room 204 in the longitudinal direction of the vehicle body. A dashboard lower panel 206 is provided on the rear side of the front frame 203 to vertically extend and separate the engine room 204 from a passenger compartment 205. The lower end portion of the dashboard lower panel 206 is bent obliquely rearward to form a rake surface portion 206a and is connected to a floor panel 207. A curved surface portion 206b and a projection portion 206c are integrally provided on the outer side of the rake surface portion 206a of the dashboard lower panel 206. The curved surface portion 206b is formed as an extension of a wheel apron and is connected to an outer panel 208. The projecting portion 206c is formed on the lower side of the curved surface portion 206b to bulge rearward and is connected to a side sill 209.

The outer frame 201 of the front frame 203 extends rearwardly and is connected to the dashboard lower panel 206. A cutaway portion is formed in the inner frame 202 in front of the dashboard lower panel 206 at a predetermined distance therefrom. A lower gusset 210 and an upper gusset 211 extending in the longitudinal direction of the vehicle body are provided to cover the cutaway portion.

Figure 16:
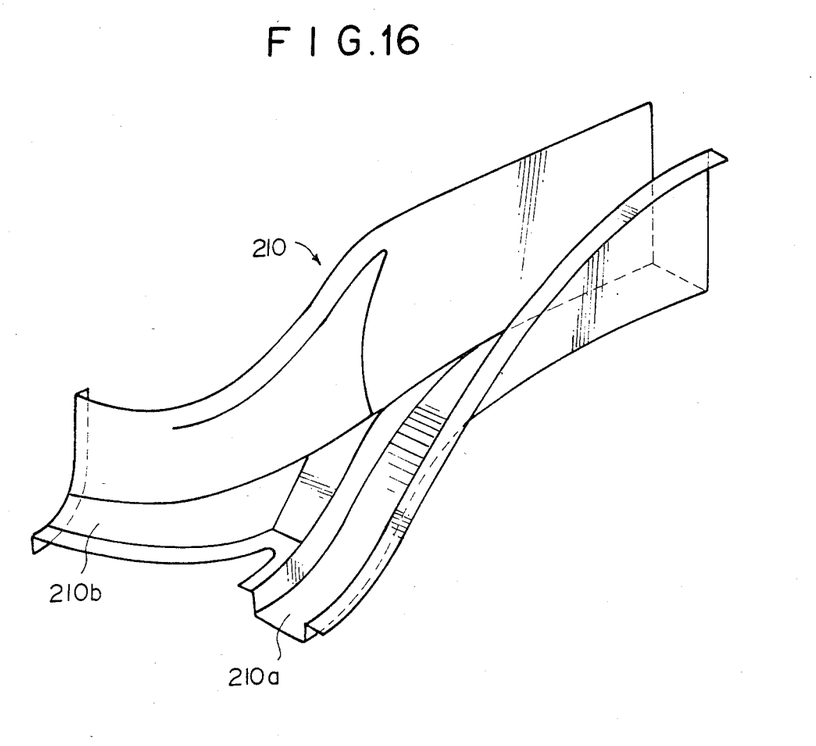
FIG. 16 is a perspective view showing the lower gusset employed in the structure of FIG. 15.

The lower gusset 210 has, as clearly shown in FIG. 16, a substantially channel-shaped cross-section with the height of the inner wall portion being gradually reduced rearward, and the outer wall portion being gradually reduced rearward, and the outer wall portion being connected to the outer frame 201. Further, the rear end portion of the lower gusset 210 extends below the dashboard lower panel 206 and is bifurcated to form a pair of rear ends 210a and 210b. The rear end 210a is connected to a channel-shaped floor frame 212 connected to lower side of the floor panel 207 to extend in the longitudinal direction of the vehicle body. The other rear end 210b of the lower gusset 210 is connected to the side sill 209. Further, the lower gusset 210 is gradually bowed downward from a portion near the front side of the dashboard lower panel 206 toward the rear end portion 210a so that the rear end portion is smoothly merged into the floor frame 212, and is gradually bowed downward from a portion near the front side of the dashboard lower panel 206 toward the rear end portion 210b so that the rear end portion 210b forms a box-like cross section together with the projecting portion 206c of the dashboard lower panel 206. The peripheral edge portion of each of the bowed portions if connected to the dashboard lower panel 206 or the floor panel 207.

The upper gusset 211 has a substantially L-shaped cross-section with the height of the inner wall portion being gradually increased rearward to conform to the shape of the inner wall portion of the lower gusset 210, and is connected to the lower gusset 210 at the inner wall portion, to the outer frame 201 at the outer wall portion and to the dashboard lower panel 206 at the rear end. The joint surface between the upper and lower gussets 210 and 211 is inclined rearwardly to be smoothly merged into the rearwardly inclined joint surface between the lower gusset 210 and the rake surface portion 206a of the dashboard lower panel 206.

Figures 17, 18, 19, 20:
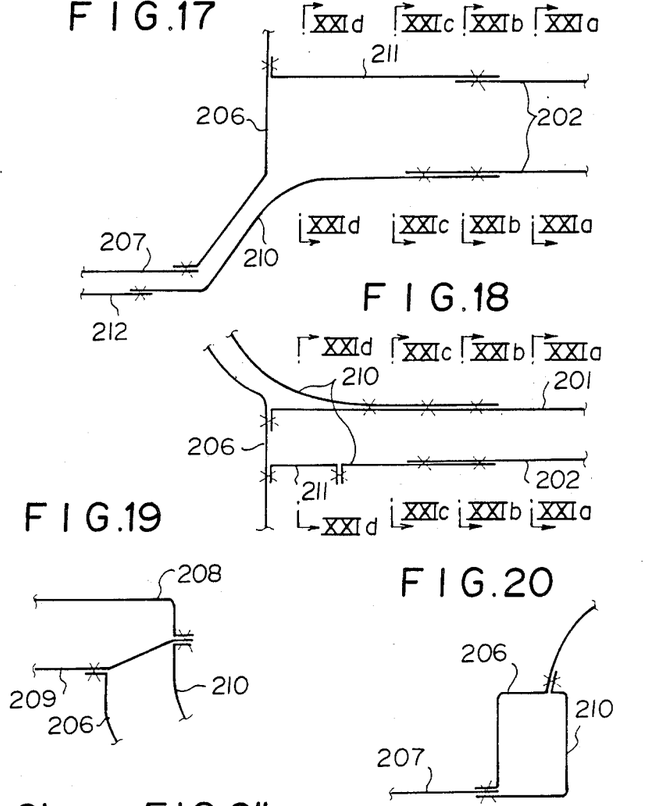
FIG. 17 is a cross-sectional view taken along line XVII—XVII in FIG. 15.
FIG. 18 is a cross-sectional view taken along line XVIII—XVIII in FIG. 15.
FIG. 19 is a cross-sectional view taken along line XIX—XIX in FIG. 15.
FIG. 20 is a cross-sectional view taken along line XX—XX in FIG. 15.
Figure 21A:
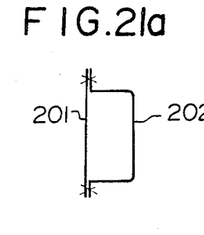
FIG. 21a is a cross-sectional view taken along line XXIa—XXIa in FIGS. 17 and 18.
Figure 21B:
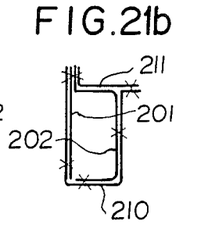
FIG. 21b is a cross-sectional view taken along line XXIb—XXIb in FIGS. 17 and 18.
Figure 21C:
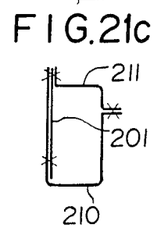
FIG. 21c is a cross-sectional view taken along line XXIc—XXIc in FIGS. 17 and 18.
Figure 21D:
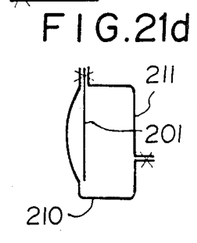
FIG. 21d is a cross-sectional view taken along line XXId—XXId in FIGS. 17 and 18.

FIGS. 17 to 20 are cross-sectional views respectively taken along lines XVII—XVII, XVIII—XVIII, XIX—XIX, and XX—XX in FIG. 15, and FIGS. 21a to 21d are cross-sectional views respectively taken along lines XXIa—XXIa, XXIb—XXIb, XXIc—XXIc and XXId—XXId in FIGS. 17 and 18.

The members are spot-welded at places indicated by X's in FIGS. 17 to 21.

As can be understood from the description above and from the drawings, in the front structure of this embodiment, the front frame 203 is connected to the rearward part of the vehicle body at the dashboard lower panel 206, the floor panel 207, the floor frame 212 and the side sill 209 by way of the lower and upper gussets 201 and 211, and the connecting points are distributed over a wide range of the frame structure. Accordingly, when an external force acts on the front frame 3, stress can be sufficiently dispersed, thereby substantially increasing rigidity of the vehicle body. At the same time, in the case of the structure of this embodiment, the part of the frame structure on the front side of the dashboard lower panel and the part of the frame structure on the rear side of the dashboard lower panel are continuous, and accordingly, load acting on the front frame can be transmitted to the floor frame and the side sill, whereby rigidity of the vehicle body can be further increased.

We claim:

1. A front structure of a vehicle body comprising a front frame which extends in the longitudinal direction of the vehicle body and is formed of an outer frame and an inner frame connected together to form a closed cross section, a dashboard lower panel disposed near a rear edge of the front frame and extending vertically, a front floor extending rearward from a lower edge of the dashboard lower panel, a side sill disposed on one side of the front floor, a floor frame disposed on an inner side of the side sill, an outer rear frame member connecting to a rear end portion of the joint frame to the side sill, and a front frame member connecting the rear end portion of the front frame to a front end portion of the floor frame; said inner frame of the front frame being channel-shaped in cross-section and said outer frame of the front frame having a bent portion which extends across the front frame to the inner frame at a portion of said front frame near a rear side of a suspension tower; said bent portion of the outer frame being connected to an inner peripheral surface of the inner frame; said outer rear frame member being connected to an outer side of said outer frame of said front frame to extend rearward from a portion of the outer frame on a front side of the bent portion to cover the bent portion.

2. A front structure as defined in claim 1 in which said outer rear frame extends below an outer portion of the dashboard lower panel to form a closed cross section together with the dashboard lower panel and is connected to the side sill with the cross section of the outer rear frame gradually changing toward the rear end from a portion near the front surface of the dashboard lower panel.

3. A front structure as defined in claim 6 in which a lower portion of said dashboard lower panel comprises a rake surface portion bent obliquely rearwardly, a curved surface portion formed on an outer side of the rake surface portion, and a projecting portion formed on a lower side of the curved surface portion to project rearwardly, the projecting portion being connected to the side sill.

4. A front structure as defined in claim 3 in which said outer rear frame member is connected to said curved surface portion and said projecting portion at a front side of the dashboard lower panel toward the side sill to form a box-like cross section.

5. A front structure as defined in claim 1 in which said joint frame member has a channel-shaped cross section which is connected to a front surface of the rake surface portion of the dashboard lower panel, a front end portion of the joint frame being connected to the inner frame of the front frame and the rear end portion of the joint frame being connected to a front end of the floor frame.

6. A front structure of a vehicle body comprising a front frame which extends in the longitudinal direction of the vehicle body and is formed of an outer frame and an inner frame connected together to form a closed cross section, a dashboard lower panel disposed near a rear edge of the front frame extending vertically, a front floor extending rearward from a lower edge of the dashboard lower panel, a side sill disposed on one side of the front floor, a floor frame disposed on an inner side of the side sill, an outer rear frame member connecting a rear end portion of the front frame to the side sill, and a joint frame member connecting the rear end portion of the front frame to a front end portion of the floor frame; said inner frame of the front frame being channel-shaped in cross section and said outer frame of the front frame having a substantially vertical wall with a bent portion which extends across the front frame to a terminus at the inner frame at a portion of said front frame near the rear side of a suspension tower, the terminus of said bent portion being connected to the inner frame.

7. A front structure as defined in claim 6 in which a lower portion of said dashboard lower panel comprises a rake surface portion bent obliquely rearwardly, a curved surface portion formed on an outer side of the rake surface portion, and a projecting portion formed on a lower side of the curved surface portion to project rearwardly, the projecting portion being connected to the side sill.

8. A front structure as defined in claim 7 in which said outer rear frame member is connected to said curved surface portion and said projecting portion at a front side of the dashboard lower panel toward the side sill to form a box-like cross section.

* * * * *